United States Patent [19]
Martin

[11] 3,810,041
[45] May 7, 1974

[54] FACE-PUMPED LIQUID LASER DEVICE

[75] Inventor: William S. Martin, Schenectady, N.Y.

[73] Assignee: General Electric Company, Schenectady, N.Y.

[22] Filed: June 14, 1971

[21] Appl. No.: 152,701

[52] U.S. Cl. .............................. 331/94.5, 330/4.3
[51] Int. Cl. ........ H01s 3/05, H01s 3/09, H01s 3/02
[58] Field of Search .................... 331/94.5; 330/4.3

[56] References Cited
UNITED STATES PATENTS

| | | | |
|---|---|---|---|
| 3,500,231 | 3/1970 | Tomiyasu et al. | 331/94.5 |
| 3,538,453 | 11/1970 | Miller | 331/94.5 |
| 3,633,126 | 1/1972 | Martin et al. | 331/94.5 |
| 3,581,229 | 5/1971 | Martin | 331/94.5 |

OTHER PUBLICATIONS

Watson et al., IEEE J. of Quantum Electronics, Vol. QB-4, No. 11, Nov. 1968, pp. 842–849. QC447I2

*Primary Examiner*—David Schonberg
*Assistant Examiner*—R. J. Webster
*Attorney, Agent, or Firm*—Paul A. Frank

[57] ABSTRACT

A flowing (or nonflowing) sheet of active liquid laser medium is optically excited along at least one of its major surfaces to produce a coherent electromagnetic radiation characteristic of the liquid medium employed. In one embodiment, a single sheet of the liquid laser medium is produced in a liquid-tight chamber. The coherent electromagnetic radiation longitudinally traverses the liquid laser medium sheet in an off-axial direction to effect multiple total internal reflections of the beam and cause each ray thereof to pass through substantially identical thermal environments thereby substantially reducing distortion of the beam wavefront. In another embodiment, a plurality of spaced refracting prisms are positioned in a liquid-tight chamber and a zig-zag pattern of the laser liquid sheets is formed in the spacings between adjacent prisms. The pumping radiation is incident on the refracting prisms and is refracted and reflected through the prisms to produce substantially uniform pumping along the major surfaces of the sheets of liquid laser medium. The pumping means is laterally positioned with respect to the laser beam axis which coincides with the longitudinal axis of the zig-zag pattern. In this case also, each ray of the beam of coherent electromagnetic radiation experiences the same temperature distribution as it passes through the sheet of liquid laser medium, thereby substantially reducing distortion of the beam wavefront.

6 Claims, 12 Drawing Figures

INVENTOR
WILLIAM S. MARTIN

FACE-PUMPED LIQUID LASER DEVICE

My invention relates to a liquid laser device wherein optical distortion due to the relatively high variation in index of refraction with temperature exhibited by most laser liquids is substantially minimized, and in particular, to a liquid laser device wherein the liquid laser medium is formed into at least one flowing or nonflowing sheet which is optically pumped through one or both major surfaces thereof.

Liquid laser devices are subject to optical distortion due to, among other factors, the relatively high variation in index of refraction with temperature exhibited by most liquids including active liquid laser mediums. The variation in the temperature of the liquid across the laser aperture results in beam distortion (especially beam divergence) and a concomitant reduction in efficiency or cessation of lasing action of the laser device. Such temperature variation generally results from (1) nonuniform optical pumping across the aperture produced by "side-pumping" of the liquid laser medium (2) turbulence in the aperture caused by mixing a nonuniformly heated liquid, (3) heating produced by the flow of the liquid laser medium due to the effects of nonzero viscosity and nonuniform velocity profile, and (4) temperature differences between the fluid and the walls of its container.

Conventional liquid lasers are optically pumped in a pumping cavity configuration similar to thst used with the rod-type solid state laser, that is, a cylindrical body of liquid laser medium is pumped from a direction perpendicular to the direction of the emitted laser beam, such pumping herein described as side-pumping. As noted above, such side-pumping produces nonuniform optical excitation and inversion across the aperture of the particular active laser medium utilized in the laser device. This nonuniform optical excitation is also present in the solid state rod-type lasers which are side-pumped. Such problem is solved in the solid state laser by forming the active laser medium into a shape whereby at least one of an opposed pair of parallel, flat, large surfaces (faces) is pumped. In a first embodiment of such face-pumped solid state laser as described and claimed in copending application Ser. No. 816,906 now U.S. Pat. No. 3,633,126, filed Apr. 17, 1969 in the names of the present inventor and J.P. Chernoch and assigned to the assignee of the present invention, the laser beam traverses an elongated, rectangular cross-sectioned laser body in an off-axial direction to effect multiple total internal reflections from the two faces and thereby reduce net distortion of the laser beam wavefront due to each ray of the beam passing through substantially identical thermal environments in its passage through the laser body. In a second embodiment of the face-pumped solid state laser as described and claimed in copending application Ser. No. 60,741, filed Aug. 3, 1970 now U.S. Pat. No. 3,679,996 in the names of the present inventor and J.C. Almasi and assigned to the assignee of the present invention, the laser beam traverses in an axial direction a plurality of planar laser elements serially assembled in a zig-zag pattern with refracting prisms forming interfaces with the laser element faces and the laser element faces being uniformly pumped by the pumping radiation impinging on other surfaces of the prisms.

Therefore, one of the principal objects of my invention is to provide a liquid laser device wherein at least one major surface or face of the liquid laser medium is optically pumped.

Another object of my invention is to form the liquid laser medium in one or more sheets of the flowing (or nonflowing) liquid to thereby obtain the major surfaces which are optically pumped.

A further object of my invention is to provide a face-pumped liquid laser device having a plurality of liquid sheets serially arranged in a zig-zag pattern and with pumping means positioned laterally with respect to the laser beam axis.

A still further object of my invention is to provide a face-pumped liquid laser device wherein the laser beam traverses a single liquid sheet in an off-axial direction to thereby undergo multiple total internal reflections.

Briefly, in accordance with my invention, I provide a face-pumped liquid laser amplifier or oscillator device wherein the liquid laser medium is formed into one or more flowing (or nonflowing) sheets of the liquid and the major surfaces thereof are optically pumped. A liquid-tight chamber is provided with ducts for supplying the liquid laser medium to the chamber and exiting the liquid therefrom. The chamber is also provided with suitable structure for forming the desired sheet or sheets of liquid laser medium. Pumping radiation means such as flash lamps are supported external of the chamber and oriented for impinging the pumping radiation along one or both major surfaces of the liquid sheets. In a first embodiment, the structure inside the chamber includes a plurality of refracting prisms transparent to the pumping radiation and having spaced adjacent first surfaces forming interfaces with the sheets of liquid laser medium flowing therebetween. The spacings between adjacent refracting prisms are arranged in a "zig-zag" pattern and the pumping radiation is incident on the prisms and refracted and reflected therethrough to produce substantially uniform pumping along the major surfaces of the liquid sheets which produces or amplifies a laser beam coincident with the longitudinal axis of the zig-zag pattern. In a second embodiment, the structure inside the chamber forms the liquid laser medium into an elongated single sheet of the flowing liquid having at least one of the major surfaces thereof being optically pumped. The laser beam passes longitudinally through the liquid laser medium sheet in an off-axial direction and undergoes multiple total internal reflections in its passage therethrough. The multiple total internal reflections cause each ray of the laser beam to pass through substantially identical thermal environments during passage through the liquid laser medium to thereby substantially reduce distortion of the beam wave front. In both embodiments, flowing of the liquid laser medium may be utilized to provide a removal of the heat generated in the liquid from the laser structure and also to minimize the variation in index of refraction of the liquid by minimizing variations of the temperature of the liquid or the containing structure with position or with time.

The features of my invention which I desire to protect herein are pointed out with particularity in the appended claims.

The invention itself, however, both as to its organization and method of operation, together with further objects and advantages thereof, may best be understood by reference to the following description taken in connection with the accompanying drawings wherein like parts in each of the several figures are identified by the same reference character, and wherein:

Figures 1, 2, 3:
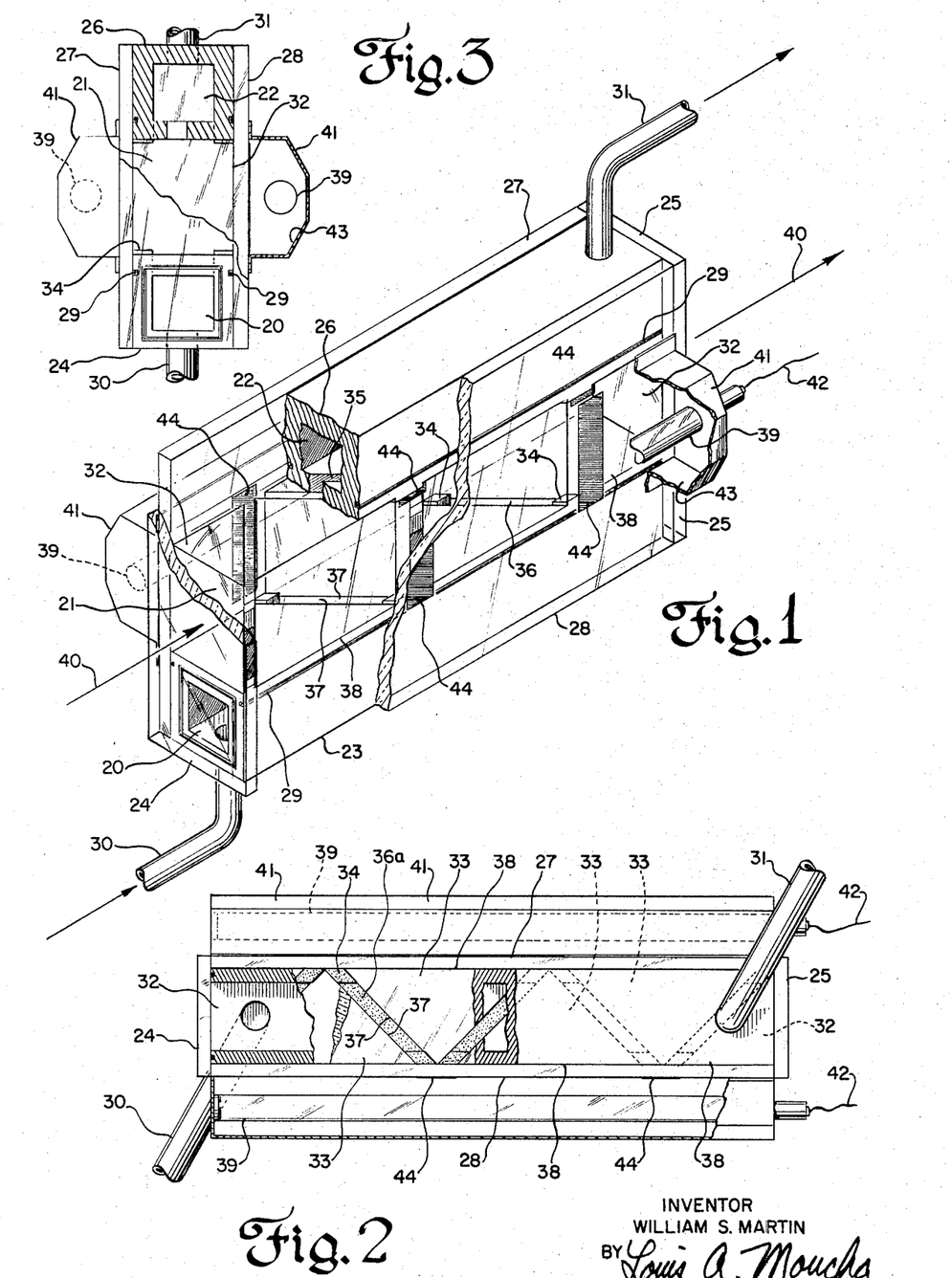
FIG. 1 is a partially broken away isometric view of a zig-zag embodiment of my liquid laser device.
FIG. 2 is a partially broken away top view of the device illustrated in FIG. 1.
FIG. 3 is a partially broken away end view of the device illustrated in FIG. 1.

FIGS. 1–3 are views of a first embodiment of what will be described herein as a zig-zag version of my face-pumped liquid laser device. The device includes a liquid-tight chamber composed of interconnected parallel oriented, elongated, linear compartments 20, 21, and 22. Compartments 20, 21 and 22 may be of square or rectangular cross-sections as two examples, it being understood that such cross-sections may also be other figures. Compartment 20 is formed of channel member 23 enclosed along three sides thereof, and planar end plate members 24, 25 for enclosing all three compartments along the two ends thereof. Compartment 22 is formed of channel member 26 also enclosed along three sides thereof, and central compartment 21 is defined along two opposite sides by the unenclosed sides of channel members 23, 26 and along the two opposite sides by planar side plate members 27, 28. Channel members 23 and 26 are fabricated of a suitable material such as a metal or plastic which is nonreactive with the liquid laser medium employed. The unenclosed (and adjacent) fourth sides of channel members 23, 26 are slotted through in a "zig-zag" pattern which is defined as alternate slots being parallel and adjacent slots angularly disposed relative to each other to form equal angles of virtually any size therebetween. Side plate members 27, 28 are fabricated of a material substantially totally transparent to the pumping radiation, such as a suitable glass and which is also nonreactive with the laser liquid. End plate members 24, 25 are fabricated of a material substantially totally transparent to the coherent electromagnetic radiation (laser beam) transmitted through central compartment 21 in a single-pass laser amplifier embodiment of my invention, and one of such end plate members 24, 25 is coated to be substantially totally reflective at the coherent radiation wavelengths in a two-pass laser amplifier embodiment. As in the case of all the embodiments disclosed herein, my device may also be utilized as a liquid laser oscillator by coating end plate members 24 and 25 to be respectively totally reflective and partially transmissive at the coherent radiation wavelengths and thereby define the well-known Fabry-Perot optical resonant cavity. Alternatively, the oscillator embodiment may be derived by positioning one or both of the Fabry-Perot cavity mirrors in spaced apart alignment with the associated adjacent end plate member 24 and, or 25. Side plate members 27, 28 and end plate members 24, 25 are fastened to channel members 23, 26 in any suitable manner to provide a substantially liquid-tight structure, a groove-gasket structure 29 around channel members 23 and 26 being illustrated as one example for obtaining the liquid-tight condition, the fastening means being a suitable adhesive or clamping means such as machine bolts and nuts (not shown). It should be appreciated that a liquid-tight structure is not an absolute necessity, but is preferred to avoid supplying a make-up liquid laser medium in the case of slight leaks.

Tubing 30 connected to, or adjacent a first end of (inlet duct) compartment 20 forms the inlet means for the liquid laser medium. Tubing 31 connected to, or adjacent the opposite end of (outlet duct) compartment 22 forms the outlet means for such liquid. Alternatively, the liquid may enter the device through tubing 31 and exit through tubing 30, but the first approach is preferred as a technique for permitting escape from compartment 21 of any bubbles developed in the liquid. The remote ends of tubings 30 and 31 are connected to a suitable pump means (not shown) for circulating the liquid laser medium from the structure through tubing 31 and back into the structure through tubing 30, a suitable cooling means for the liquid also being incorporated, if desired, or required by the particular circumstances.

Compartment 21 contains a plurality of serially arranged refracting prisms which are substantially transparent to both the coherent electromagnetic radiation wavelengths and electromagnetic radiation of pumping wavelengths used for optically exciting the liquid laser medium. The refracting prisms include two end prisms 32 and at least one intermediate prism 33 retained in spaced apart relationship therebetween by any convenient means for forming a zig-zag pattern of spacings 36 between adjacent prisms. Prisms 32 and 33 are each right angle prisms and are equally spaced in the illustrated embodiments although these are not limitations on my invention. The prisms may be truncated to eliminate the possibility of spontaneous lasing along the liquid zig-zag path through reflections off the surfaces of channel members 23 and 26. Thus, prisms having different angular dimensions may readily be utilized in a compartment 21 conforming to such shape, and the spacing 36 between adjacent prisms may be unequal when desired for particular circumstances. In the illustrated preferred embodiments, prisms 33 have isosceles triangular top and bottom faces, and end prisms 32 are each equivalent to half an intermediate prism 33 as if cut transversely through the center thereof. The included angle between the base and either side of the isosceles triangles formed by the top and bottom faces of the refracting prisms equals the slot angle. Obviously, end prisms 32 may have other configurations such as hexahedronal which is merely an extension of the illustrated pentahedron prism 32. The prisms are retained in a desired spaced apart relationship in any convenient manner and exemplified by tabs 34 provided in the four corners of each spacing 36, the tabs being oriented in spacing 36 with their width dimension equal to the width of such spacing. These tabs may be formed as part of the bottom and top surfaces of channel members 26 and 23, respectively, in the machining of such surfaces.

The zig-zag pattern slots 35 in the top and bottom sides of channel members 23 and 26, respectively, are aligned with, and of width equal to, the zig-zag spacings 36 between adjacent prisms. Thus, flowing sheets 36a (depicted in FIG. 2) of liquid laser medium are confined and thereby formed in spacings 36 by a flow of liquid laser medium entering through inlet tubing 30 into compartment 20, flowing through such compartment's slots 35 into spacings 36 and exciting through compartment's 22 slots 35 into compartment 22 and tubing 31. The flowing sheets 36a of liquid laser medium are therefore of the same dimensions and form as spacings 36 and in the same zig-zag orientation. These liquid laser medium sheets are illustrated herein as being of planar form although it is to be understood that nonplanar sheets may also be formed, if desired, by utilizing refracting prisms having the desired nonplanar shape along the major surfaces thereof which interface the spacings 36. In most cases, however, the liquid sheets are thin in comparison to their length and breadth. It should be understood that there may be some applications wherein the sheets of liquid laser medium need not be flowing, and thus my invention disclosed in the FIGS. 1-13 embodiments is not limited to sheets of liquid laser medium which are continuously flowing during operation of the device.

Assuming the general case wherein a laser beam with a planar wavefront is either to be generated in an oscillator embodiment of my invention, or an incident laser beam is to be amplified in an amplifier embodiment, the first major side surfaces 37 of the refracting prisms 32 and 33 which interface spacings 36 are planar. The second major side surfaces 38 of the prisms which are remote from spacings 36 and juxtaposed to side plate members 27, 28 are the means through which the flowing sheets of liquid laser medium are optically pumped (optically excited sufficiently to establish a population inversion in a particular excited energy state characteristic of the particular liquid laser medium). The pumping means may comprise, as an example, one or more flash lamps 39 positioned adjacent one or both sides of my device along the second major surfaces 38 of the prisms. Surfaces 38 of alternate prisms are coplanar. This particular arrangement provides for a face-pumped laser device with the pumping means positioned laterally with respect to the laser beam axis which coincides with the longitudinal axis of my device and indicated in FIG. 1 by arrows 40. The refracting prisms cause substantially uniform illumination, and thus uniform activation or excitation across the major surfaces of the sheets (defined by the length and breadth thereof) of active liquid laser medium (i.e., across the laser aperture) by the refraction and reflection of the pumping radiation incident upon surfaces 38 of the prisms 32 and 33, and thereby substantially eliminate one cause of laser beam distortion.

In a preferred embodiment of my invention, flash lamps 39 are parallel to both side surfaces of my device as shown in FIGS. 1-3. The flash lamps are supported on each side within a housing 41 attached to side plate members 27 and 28. The electrode ends of the flash lamps are connected to a suitable pulsed, high voltage d.c. power supply (not shown) by means of electrical conductors 42. The inner surface 43 of housing 41 is highly reflective to reflect the pumping radiation emitted by the flash lamps substantially uniformly over major surfaces 38 of prisms 32 and 33. The reflectors may also be fabricated of a material such as aluminum. The flash lamps may be cooled in a conventional manner and a filter utilized for minimizing the pumping radiation not effective in producing population inversion in the laser liquid. If desired, suitable masks 44 may be fastened on the inner, and, or outer surfaces of pumping radiation transparent side plate members 27, 28 extending vertically (as depicted in FIG. 1) along the spacings 36 adjacent prisms to prevent spontaneous lasing along the liquid zig-zag path or to prevent side pumping of the liquid laser medium sheets. The material comprising masks 44 may be a ground glass for providing a nonspecularly or diffusely reflecting surface to prevent the spontaneous lasing, or a reflecting mirror such as a polished strip of aluminum to prevent the side pumping.

The active liquid laser medium employed in my device may be any laser liquid including a number of classes of organic dyes which are generally physically colored powders dissolved in a suitable solvent such as water, ethanol, methanol, dimethyl sulfoxide (DMSO), ethylene glycol or fluorocarbons as typical examples. The organic dyes generally have the characteristic of fluorescing when dissolved in the solvent. One specific example of a class of organic dyes which are used in my device is the xanthene class, and an example of a dye in such class is rhodamine 6G. Rhodamine 6G when dissolved in a solvent such as ethanol or DMSO produces an orange fluorescence. DMSO is especially desirable as the solvent since it permits a close matching of the index of refraction of the liquid laser medium to that of the prisms which may be fabricated of a fuzed quartz or glass and has other desirable thermal, mechanical and optical properties as defined in the above-identified U.S. Pat. No. 3,679,996. Another class of suitable laser liquids is a solution of neodymium ions in solvents which contain no low atomic weight constituents, such as selenium oxychloride.

In operation, flash lamps 39, which may be of the xenon arc type, produce pumping radiation which substantially uniformly illuminates adjacent surfaces 38 of end prisms 32 and intermediate prisms 33. The pumping radiation passes through the prism-liquid laser medium interfaces and is substantially uniformly incident over the major surfaces of the liquid laser medium sheets, any mismatch of the prism-liquid laser medium refraction indices causing a slight departure from the idealized and desired completely uniform pumping across the major surfaces of the liquid laser medium and also causing reflection losses in the laser beam being transmitted through the device. However, the departure from the uniform pumping in the nonindex-matched case is generally only up to a maximum of approximately 5 percent, and is therefore usually negligible and the reflection losses are only in the order of 1–2 percent for the favored polarization of the laser beam. The reflection losses can be reduced by orienting the prism-liquid laser medium interfaces such that the laser beam has an angle of incidence at such interfaces approximately equal to Brewster's angle which is generally close to 45°. Thus, it should be understood that maximum transmission of the laser beam through my zig-zag liquid laser device is obtained by refraction index matching of the liquid laser medium and refracting prisms, although an index mismatch can be tolerated by arranging the zig-zag geometry angle to achieve transmission through the index mismatched interfaces at Brewster's angle.

The use of pumping radiation-transparent side plate members 27 and 28 also has the effect of more uniformly illuminating the surfaces 38 of prisms 32 and 33 when they are thick due to the "light pipe" effect of such glass material between the surfaces 38 of the prisms and the pumping source. The transparent side plate members 27, 28 make optical contact with surfaces 38 of the prisms or a thin layer of intermediate liquid and with total internal reflection at the sides of such light pipe, the pumping light incident upon the light pipe is refracted and reflected uniformly over prism surfaces 38. Transparent side plate members 27, 28 preferably, but not necessarily, have substantially the same index of refraction as the refracting prisms 32, 33. The surfaces of the slotted sides of channel members 23, 26 which interface the refracting prisms 32, 33 are highly polished or suitably coated to provide a reflective surface to the pumping radiation and thereby increase the "light pipe" effect by reflecting any pumping radiation incident on such surfaces toward the liquid laser medium sheets. Alternatively, the top and bottom surfaces of prisms 32, 33 may be reflection coated.

Figures 4, 5, 6:
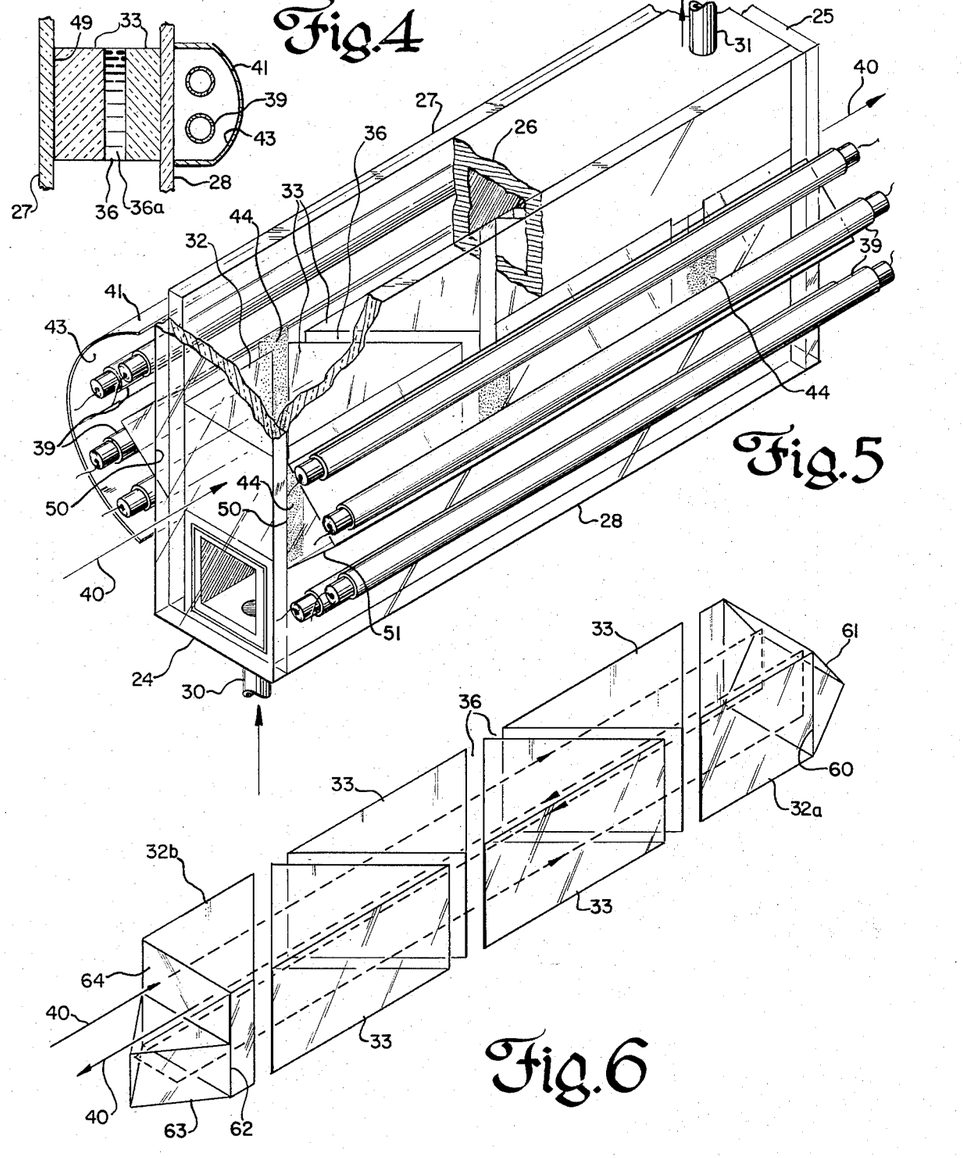
FIG. 4 is an end view in section of the prism and pumping portion of the device of FIG. 1 but with pumping limited to only one side.
FIG. 5 is a partially broken away isometric view of a zig-zag embodiment of my liquid laser device utilized with immersion apparatus.
FIG. 6 is an isometric view of the refracting prism portion of a zig-zag embodiment of my liquid laser device utilized with laser beam path folding apparatus.

The liquid laser medium sheets may be optically excited from both sides as illustrated in FIGS. 1, 2 and 3 or merely from one side as shown in the sectional end view of FIG. 4, in the latter case, the transparent side plate member 27 being coated with a mirror coating 49 substantially totally reflective to the pumping radiation. Alternatively, a mirror separate from member 27 may be utilized. Thus, the pumping radiation not absorbed upon the first pass through the liquid laser sheets is reflected back into the active liquid laser medium by reflector 49 and it is evident that optical pumping from a single lateral position is also efficient.

FIG. 5 illustrates still another embodiment of the laterally face-pumped liquid laser device in accordance with my invention which employs an immersion technique described in the aforementioned U.S. Pat. No. 3,679,996. The immersion technique increases the density of the pumping radiation flux upon the major surfaces of the liquid laser medium sheets. Element 51 is an optical element not limited to prisms. The right angle subtending surface 50 of a right angle prism 51 having an index of refraction equal to or greater than the square root of two is oriented parallel to the device longitudinal axis and fastened to achieve a high degree of optical continuity with the right angle subtending surfaces 38 of the intermediate and end prisms 33 and 32. A plurality of flash lamps 39 in housing 41 having reflective inner surface 43 are arranged in banks approximately parallel to the right angle defining surfaces of the right angle prism 51 such that substantially all of the pumping radiation incident upon such right angle defining surfaces due to the optical and physical characteristics of the right angle prism is refracted and totally reflected upon the right angle subtending surfaces 38 of prisms 32 and 33. This immersion technique increases the flux density of the pumping radiation by a factor of approximately the square root of two and, concurrently, uniformly illuminates the major surfaces of the liquid laser medium sheets. The immersion technique may be employed on both sides of my structure as illustrated in FIG. 5, or as in the case of the FIG. 4 embodiment, may be employed only on one side with a surface reflective to the pumping radiation being coated or otherwise disposed on or adjacent the opposite side. In all other details, the structure of the FIG. 5 embodiment may be the same as that depicted in FIG. 1.

FIG. 6 illustrates the prism portion of a zig-zag liquid laser device in accordance with my invention utilizing a folded path technique also described in the aforementioned U.S. Pat. No. 3,679,996. The remainder of the structure may be the same as in FIG. 1. A right angle subtending surface 60 of a right angle prism 61 makes optical contact (or at least achieves a high degree of optical continuity) with and effectively covers the total end surface (i.e. the laser device aperture) of one end prism 32a. At the opposite end, a right angle subtending surface 62 of a second right angle prism 63, smaller in size, makes optical contact (or achieves a high degree of optical continuity) with the lower half of the end surface 64 of the other end prism 32b. The orientation of the apex of prism 63 is rotated 90° with respect to that of prism 61.

A laser beam (denoted by arrow-indicated lines 40) may enter the upper left quadrant of surface 64 of end prism 32b through an input port (not shown), make four passages through the active liquid laser medium sheets, and exit through the upper right quadrant of surface 64 through an output port (not shown). As is evident from FIG. 6, laser beam 40 penetrates a different region (quadrant) of each liquid laser sheet in each passage through the prism assembly. The penetration of different regions allows an effective extraction of the stored energy in the active liquid laser medium and by increasing the number of prisms adjacent one end prism 32b, the number of reflective passages may also be increased with a concurrent increase in amplification of the input laser beam as will be described with reference to the FIG. 11 embodiment of my invention.

The embodiments of my face-pumped liquid laser device described above and illustrated in FIGS. 1–6 each utilize pumping means positioned laterally with respect to the laser beam axis and a plurality of refracting prisms which refract and reflect the pumping radiation substantially uniformly across each thin liquid laser sheet (the laser aperture) due to the positioning of the liquid laser sheets in a zig-zag pattern. The positioning of the pumping means to the side allows a more compact, flexible arrangement and, concurrently, eliminates the need for optical separators between the pumping radiation and laser beam. Another variation of my face-pumped liquid laser device is described hereinafter and illustrated in FIGS. 7–13 wherein wavefront distortion is minimized by the passage of the laser beam through an elongated, rectangularly cross-sectioned flowing (or nonflowing) thin sheet of liquid laser medium in an off-axial direction to effect multiple total internal reflections of the beam in its passage through the liquid laser medium sheet. Since each ray of the coherent beam passes through substantially identical thermal environments during the transmission of the beam through the liquid laser sheet, the net distortion of the beam wavefront is substantially reduced.

Figure 7:
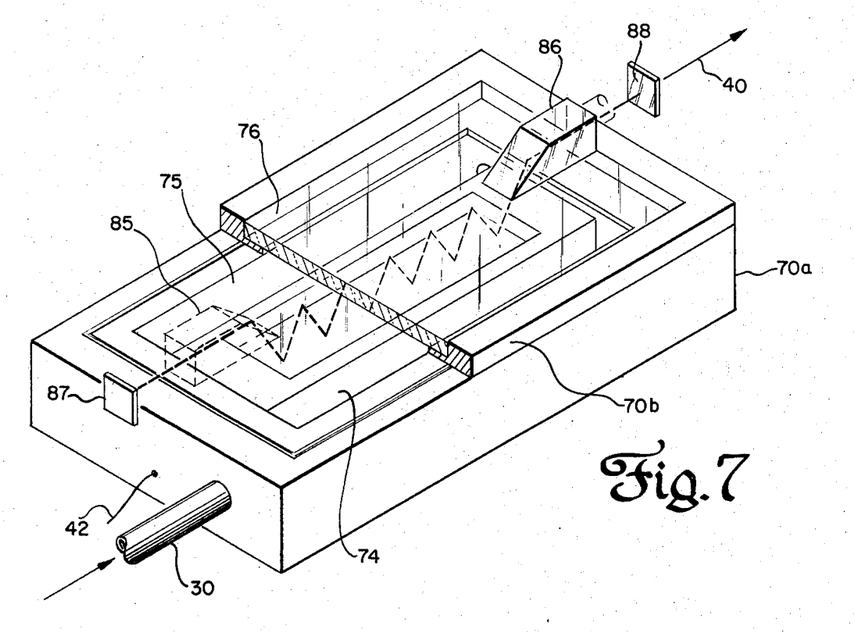
FIG. 7 is a partially broken away isometric view of a multiple internal reflection embodiment of my liquid laser device.
Figure 8:
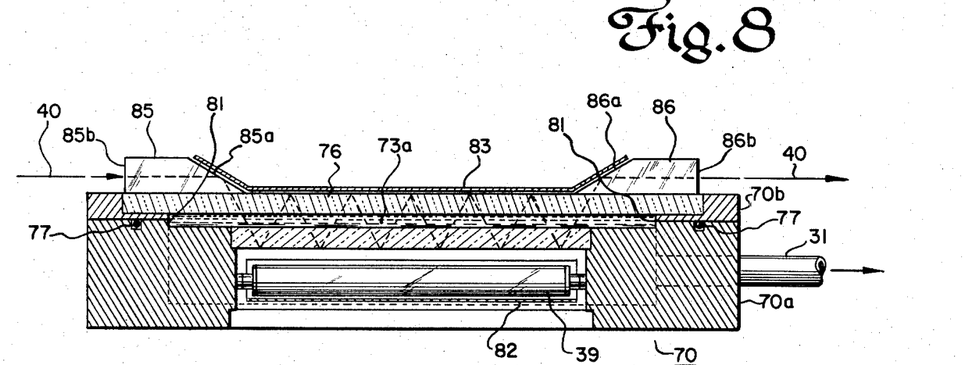
FIG. 8 is a longitudinal view, partially in section, taken through the center of the device of FIG. 7.
Figure 9:
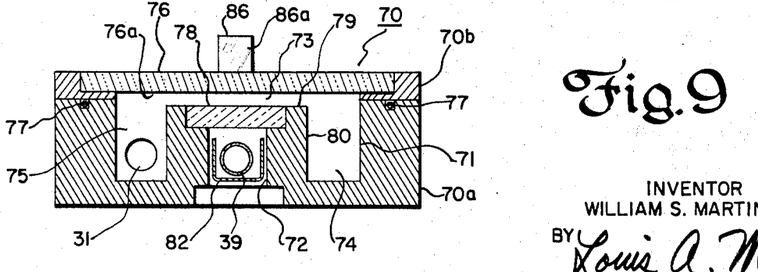
FIG. 9 is a transverse sectional view taken through the center of the device of FIG. 7.

Referring now to FIGS. 7, 8 and 9, there are shown an isometric view, longitudinal view partly in section, and transverse sectional view, respectively, of a first embodiment of my face-pumped, multiple internal reflection, off-axial liquid laser device. The device includes a housing 70 having included therein a liquid-tight chamber 71 in which the sheet of flowing liquid laser medium is developed, and a second chamber 72 for containing the pumping radiation flash lamps. Liquid-tight chamber 71 comprises a central region 73 for confining the flow of liquid laser medium (and thereby forming the sheet 73a) and two side ducts or channels with appropriate tubings for supplying the liquid laser medium to central region 73 and for exiting it therefrom. Thus, tubing 30 provides an inlet means for introducing the flow of liquid to side duct 74 which is interconnected with central region 73 along a first side thereof, and tubing 31 provides the outlet means for exiting the liquid flow from side duct 75 interconnected with central region along a second side thereof, opposite to the first side. Tubings 30 and 31 are shown as being connected at opposite ends of ducts 74 and 75, respectively, it being obvious that connections could be made at other regions of such ducts. Again, the pump means for circulating the liquid through the tubings and the device, and external liquid cooling means which may be used, are not illustrated. Side ducts 74, 75 may have any of a number of forms, the criteria being that a substantially uniform supply of liquid be provided to central region 73 as the liquid passes through central region 73 from duct 74 to duct 75. In the illustrated embodiment, ducts 74, 75 are rectangular cavities of equal size formed into base member 70a of housing 70, the longitudinal axes of the two cavities 74, 75 being parallel with the longitudinal axis of central region 73.

Central sheet forming region 73 is defined by parallel, planar top and bottom surfaces, the top surface thereof being the bottom surface 76a of planar top plate member 76. Top plate member 76 is fabricated of a material such as glass substantially totally transparent to both the coherent and pumping electromagnetic radiation wavelengths, is of sufficient length and width to overlap that portion of central region 73 which is opposite pump lamp chamber 72 and is suitably attached on a shoulder portion of housing upper member 70b to form a liquid-tight seal. Many other configurations of top plate member 76 and housing upper member 70b may obviously be used. Upper housing member 70b is fastened to base member 70a in any suitable manner and a groove-gasket structure 77 provides a liquid-tight seal therebetween. The bottom surface of central region 73 is defined by the top surface of intervening planar glass plate member 78 and the coplanar top surface 79 of a central wall member 80 of base member 70a. The central wall member 80 separates the liquid laser medium cavities 74, 75 from the optical pumping cavity 72 and is provided with grooves along the inner upper edges thereof forming shoulders for supporting intermediate plate member 78. Intervening plate member 78 is also substantially totally transparent to the coherent and pumping electromagnetic radiation wave-lengths and it separates the liquid laser medium sheet forming region 73 from chamber 72 which contains the flash lamp or lamps 39. Since the surfaces of base member 70a and transparent members 76, 78 (and also upper member 70b in many cases) are in contact with the liquid laser medium, they must be nonreactive therewith. The top surface of transparent plate 76 and the bottom surface of transparent plate 78 are polished to an optical flatness, e.g., flat to within ⅛ of the wavelength of the coherent radiation emitted by the liquid laser medium sheet to minimize losses and distortion during reflection of beam 40. The central region 73 is enclosed along its longitudinal sides by interior end walls 81 of housing 70. An exemplified pumping means in the form of one or more parallel disposed flash lamps 39 are positioned in chamber 72, a third cavity formed within the housing base member 70a. To assure substantially uniform pumping of the major surface (or both major surfaces if liquid laser medium sheet 73a is pumped from both sides as in FIG. 13) the radiation emitting portions of lamp(s) 39 are parallel with central region 73 and extend substantially the entire length of sheet 73a of the liquid laser medium. A reflective surface on the walls of cavity 72, or separate pumping radiation reflector 82, maximizes the intensity of pumping radiation penetrating the sheet of liquid laser medium to produce the population inversion therein. Cavity 72 may also be of rectangular or other forms and is juxtaposed in parallel relationship with cavities 74 and 75. In the case of only single-sided (bottom face) pumping, the top surface of transparent top plate member 76 is coated to be substantially totally reflective to the pumping radiation wavelengths, or is provided with an external pumping radiation reflector 83 as illustrated in FIG. 8. Obviously, the orientation of the single-sided pumping and reflector 83 may both be reversed, if desired.

A pair of glass prisms 85 and 86 are suitably mounted at opposite ends of the liquid laser medium sheet 73a to direct the laser beam 40 upon optically plane surfaces at an angle of incidence to produce total internal reflection of the incident beam. The bases of prisms 85 and 86 may be fixedly secured to the top surface of transparent plate 76 by an optically contacting adhesive such as glycerine, the prisms being oriented in alignment at opposite ends of plate 76 and centrally thereof from the sides.

An incident laser beam 40 impinges upon outer end face 85b of prism 85 at an attitude normal relative to the plane of the face and is then reflected off angularly disposed face 85a into and through the sheet 73a of liquid laser medium at an angle of incidence producing a total internal reflection of the incident beam as illustrated in FIGS. 7 and 8. A typical angle of incidence is approximately 45° as described in the aforementioned U.S. Pat. No. 3,633,126. The rays of the incident beam are thus reflected at a 45° angle off the optically plane bottom surface of glass plate 78 (i.e., a glass-air interface). Alternatively, prisms 85 and 86 may have sloped outer surfaces 85b, 86b and the laser beam is incident on such surface at Brewster's angle, thereby eliminating the reflection losses at said faces. Also, the multiple internal reflections may be from glass-water or other glass-chamber 71 outer environment interfaces necessitating the refractive index of the chamber outer environment be less than that of the glass and laser liquid. Also, the angle of incidence between the laser beam and laser liquid-glass interface may be made to be Brewster's angle for the case of a liquid with index significantly different from glass, thus minimizing losses for a polarized beam. The geometric area of the prism faces and beam and the angle of incidence of the beam upon such interface assures the passage of the beam through substantially the entire volume of the liquid laser sheet in a single pass down the sheet thereby maximizing laser device efficiency. The pumping radiation reflector 83 may extend along a portion of the prism faces 85a, 86a, if desired.

Prisms 85 and 86 thus provide the means for introducing a laser beam in an off-axial direction into the liquid laser sheet and for exiting the beam therefrom preferably in alignment with its original axis (prior to its introduction into the device). As employed herein, off-axial direction signifies an angular, or nonparallel disposition of the laser beam relative to the longitudinal axis of the liquid laser sheet such that the angle of incidence of the laser beam on the optically plane surfaces of glass plate members 76 and 78 produces multiple total internal reflections of the laser beam off the glass-air interfaces thereof during traverse of the laser beam between prisms 85 and 86.

Laser beam 40 traverses the length of the liquid laser sheet as seen in FIGS. 7 and 8 in oscillating fashion, being multiply reflected off the upper plate 76-air and lower plate 78-air interfaces before emerging from the outer end face 86b of prism 86 in amplified form. Because each ray of the coherent beam passes through identical diverse regions in the liquid laser medium which are generally nonuniform in temperature, especially if a liquid nonflowing operating mode is employed, all rays lying within the plane of FIG. 8 pass through substantially identically mixed optical environments and the wavefront of the beam is affected uniformly thereby substantially eliminating thermal-optic distortion of the wavefront, that is, the net phase distortion of the beam wavefront upon traverse through the liquid laser sheet is substantially reduced relative to distortion produced within an axially transmitted coherent beam of electromagnetic radiation in a rod-like liquid laser. This feature is especially important in high repetition rate operation of the laser device wherein the resulting thermal gradients across the thickness of the liquid laser medium sheet (the laser device aperture in the rod-like laser) becomes significant.

The outer faces 85b and 86b of prisms 85 and 86, respectively, may be coated with the hereinabove-mentioned totally reflective and partially transmissive mirror coatings for converting the laser amplifier into an oscillator. Alternatively, a substantially totally reflective mirror 87 may be positioned adjacent the outer face 85b of prism 85 and a partially transmissive mirror 88 positioned adjacent the outer face 86b of prism 86, (see FIG. 7) mirrors 87 and 88 being aligned with the longitudinal axes of prisms 85 and 86 to convert the mirrorless single-pass laser amplifier to a laser oscillator. A single totally reflective mirror, or coating on only one prism 85 or 86 converts the single-pass amplifier to a double-pass amplifier.

Figures 10, 13:
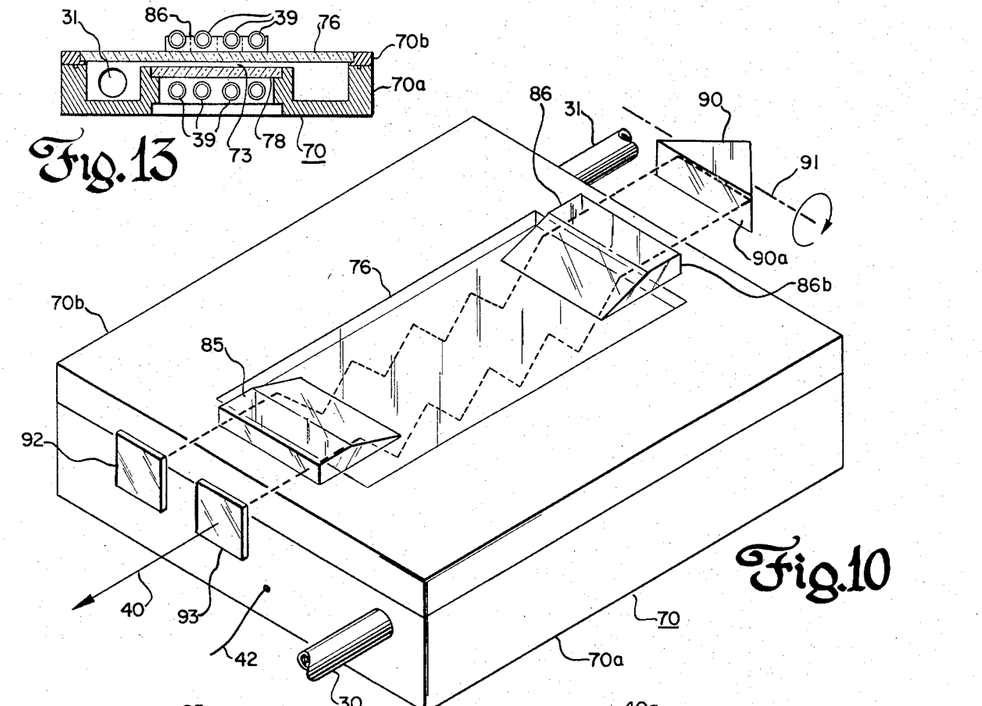
FIG. 10 is an isometric view of a multiple internal reflection embodiment of my liquid laser device utilized with single laser beam path folding apparatus.
FIG. 13 is an end view in section of the device of FIGS. 11 and 12 but with pumping on both sides of the liquid laser medium sheet.

A further increase in amplification of the off-axial liquid laser device is achieved by employing the device illustrated in FIG. 10 wherein the laser beam is folded back once through diverse portions of the sheet of flowing liquid laser medium. The pumping radiation means is not illustrated here for purposes of drawing simplification. Prism 86, like prism 85, functions to refract the coherent laser beam 40 from a plane parallel to the top surface of transparent plate 76 to a plane disposed at an angle in excess of the critical angle of incidence relative to the bottom surface of transparent plate 78. A reflector 90, such as a right angle prism is supported in alignment with prisms 86 adjacent outer face 86b such that the right angle subtending major face 90a of prism 90 is parallel with face 86b (alternatively, it may be at Brewster's angle to the incoming laser beam) and the prism 90 triangular faces are parallel with the laser beam.

The laser device of FIG. 10, as well as the other disclosed embodiments may be Q-switched with devices such as a Pockel's Cell or may be operated in a Q-switch mode by rotating prism 90 about transverse axis 91 as indicated by the circular arrow to intermittently transfer the coherent electromagnetic radiation between prisms 86 and 90. Thus, in the stationary position of prism 90, or during rotation upon its orientation being the same as in the fixed position (i.e., face 90a being parallel with face 86b), the laser beam is reflected by prism 90 to longitudinally pass through the portion of the liquid laser medium sheet untraversed by the laser beam approaching prism 90 and with the same multiple total internal reflections off the glass-air interfaces. FIG. 10 illustrates prism 90 in the particular orientation to obtain the hereinabove described reflection whereby the laser beam 40 traverses a return path through the liquid laser sheet. Juxtaposed, totally reflective and partially transmissive mirrors 92 and 93, respectively, function to reflectively transmit coherent electromagnetic radiation through the sheet of flowing liquid laser medium to convert the device to a double-pass laser oscillator. Omission of mirrors 92, 93 converts the device into a double-pass liquid laser amplifier. Substitution of two lenses each substantially totally transparent to the coherent radiation for mirrors 92, 93 may be made, if desired, and the two lenses then constitute the input and output ports. End prism 90 may obviously be integral with prism 86, and other forms of external prisms or mirrors and different shaped face 86b of prism 86 may also be utilized in the FIG. 10 embodiment to obtain the double-pass traverse of the laser beam through the liquid laser medium sheet. The single-folded path (i.e. double pass) embodiment of my multiple internal reflection, face-pumped liquid laser obviously obtains a greater amplification of the laser beam as compared to a single-pass embodiment as illustrated in FIGS. 7–9.

Figure 11:
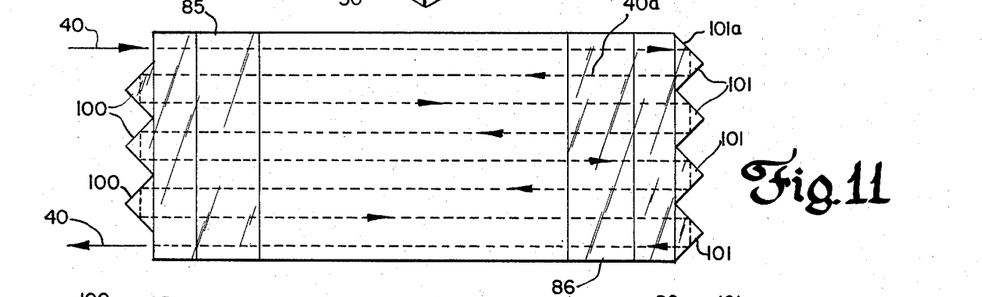
FIG. 11 is a top view of the prism and liquid laser medium sheet portion of a multiple internal reflection embodiment of my liquid laser device utilizing multiple laser beam path folding.
Figure 12:
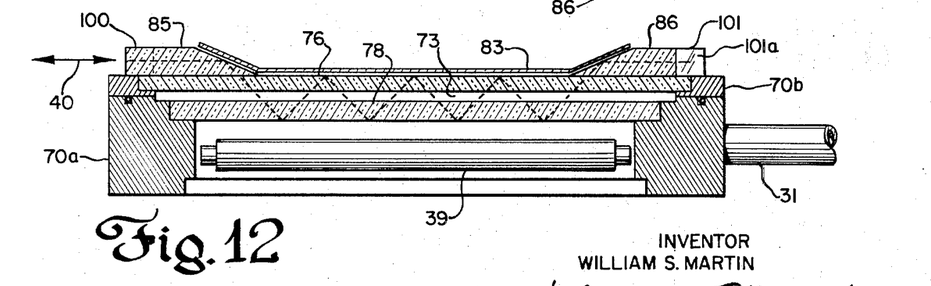
FIG. 12 is a longitudinal view, partially in section, taken through the center of the device shown only in part in FIG. 11.

A still further amplification of the laser beam is obtained in the multi-path embodiment of my off-axial, multiple internal reflection, face-pumped laser device illustrated in FIGS. 11 and 12 wherein the laser beam multiply traverses the flowing sheet of liquid laser medium in an off-axial direction by means of a plurality of triangular reflector prisms 100 and 101 mounted along the outermost surfaces of refracting prisms 85 and 86. Alternatively, prisms 85 and 100, and prisms 86 and 101 could be fabricated as single elements. The beam of coherent electromagnetic radiation, identified by center ray 40, is admitted to the liquid laser medium sheet by prism 85 at an angle to produce a plurality of total internal reflections of the beam between the two glass-air interfaces in an initial pass longitudinally through the liquid sheet through a fractional corss-sectional area thereof. At the end of the first pass, the coherent electromagnetic radiation beam is refracted by prism 86, and impinged upon reflective face 101a of triangular prism 101 to be returned along a path 40a abutting the originally traversed path. The beam then is reflected in an identical manner between the outer triangular prisms 100 and 101 to substantially completely fill the volume of the flowing sheet of liquid laser medium, and exits the liquid laser medium by prism 85 (or prism 86 if desired) at a region remote from the beam admission region. In the preferred arrangement the laser beam 40 is narrow in width relative to the width of the liquid laser sheet, i.e., the beam width is sufficiently less than the liquid laser sheet width (breadth) to permit employment of an essentially square beam traversing substantially the total liquid laser sheet volume.

The laser beam in the FIGS. 7–13 embodiments may be admitted and removed from the liquid laser medium adjacent the same major surface thereof as illustrated, or, the admittance and removal paths may be on the two opposite major surfaces thereof (not shown). The beam path folding prisms of the FIG. 6 embodiment may also be used with my FIG. 7 embodiment, if desired, and, in like manner, the beam path folding prisms of the FIG. 11 embodiment may be used in FIG. 1. The immersion prism of FIG. 5 may also be utilized in the FIGS. 1–4, 6–13 embodiment, if desired, for increasing the density of the pumping radiation incident on the sheet or sheets of flowing liquid laser medium. An additional laser liquid sheet, oriented normal to the beam axis, may be utilized between each pair of zig-zag pattern sheets for increased laser beam amplification, at the expense of some pumping nonuniformity over the aperture.

The transverse sectional view in FIG. 13 of a liquid laser device of the type illustrated in FIGS. 7–12 indicates that a plurality of flash lamps 39 may be employed for optically exciting the flowing sheet of liquid laser medium through both major surfaces rather than through only one such surface.

It is to be noted that conventional rod-like liquid laser oscillators generally are characterized by reflective surfaces, such as mirrored end faces, disposed at a perpendicular attitude along the longitudinal axis of the liquid laser body while the reflective surfaces of the laser devices disclosed in the FIGS. 7–13 embodiments herein either are acutely disposed relative to the longitudinal axis of the liquid laser sheet, or are situated perpendicular to the longitudinal axis at a location outside the longitudinal plane of the liquid laser sheet. Further, compared with the rod-like lasers (which have an aperture determined by the rod-shaped liquid cross sections), the embodiments disclosed herein in FIGS. 1–13 can be large aperture devices (determined by the breadth dimension of the liquid sheet) with relatively small volumes of liquid being employed.

From the foregoing, it can be appreciated that the objectives set forth have been met and that my invention provides a liquid laser device wherein at least one major surface (face) of a flowing (or nonflowing) sheet of active liquid laser medium is optically pumped. The liquid laser device may be of a form utilizing only a single sheet of the liquid in which case the laser beam longitudinally traverses the sheet of liquid laser medium in an off-axial direction to effect multiple total internal reflections of the beam off the air-glass interfaces such that each ray of the beam traverses the same variety of optical environments within the liquid laser medium sheet and thereby minimizes wavefront distortion of the beam. In the embodiment of my invention utilizing a plurality of sheets of the liquid laser medium arranged in a zig-zag pattern, the laser beam longitudinally traverses the zig-zag arrangement along the longitudinal axis of the device. In the zig-zag embodiment, each ray of the laser beam also traverses the same variety of optical environments in each liquid sheet to thereby minimize laser beam distortion. The face-pumping feature of my invention appreciably improves the optical quality of the active laser liquid since the inversion and temperature distribution are essentially uniform across the aperture of the laser beam and the path length through the liquid is relatively short. Face-pumping allows an increase in maximum achievable optical pumping density by using the immersion technique described herein. Finally, face-pumping geometry is particularly compatible with circulation of the active medium, a necessary requirement for high repetition rate or CW excitation at high powers, since the liquid flows transverse to the laser beam.

A characteristic advantage of both the zig-zag and off-axial, multiple total internal reflection embodiments of my invention is that within broad limits the thickness of the laser liquid sheets may be optimized for liquid flow and low distortion considerations, and the active laser medium concentration may then be chosen for optimal absorption of the pump light in this thickness, all completely independent of the laser aperture. This decoupling of the variables provides a new degree of freedom (not present in the rod-type liquid laser) in the design of liquid lasers to meet requirements of specific applications. Also, the thin sheets of laser liquid permit the attainment of a laser aperture much larger than in the rod-type liquid laser (especially in the zig-zag embodiment) and with a smaller volume of the laser liquid being utilized.

While the invention has been set forth with respect to certain embodiments and specific examples thereof, many modifications and changes will readily occur to those skilled in the art. Although only two specific laser liquids (solutions of rhodamine 6G and neodymium) have been described hereinabove, it is to be understood that my invention is intended to include the use of any laser liquid as is also stated hereinabove.

The terms "active liquid laser medium" and "laser liquid" are used synonymously herein, and are defined as any liquid having the capability of being excited or optically pumped into one or more particular upper level or energy states characteristic of the particular liquid and achieving a sufficient population inversion in such state to cause a stimulated emission of coherent electromagnetic radiation therefrom again characteristic of the particular liquid. Other examples of typical classes of laser liquids (other than the aforementioned xanthene) are the courmarin dyes as exemplified by 7 diethyl amino -4- methyl coumarin, and naphthalimide, fluoranthene and acridine. It is, therefore, to be understood that changes may be made in the particular embodiments of my invention as described which are within the full intended scope of my invention as defined by the following claims.

I claim:

1. A face-pumped liquid laser device comprising means for containing an active liquid laser medium and for forming a plurality of thin sheets of the active liquid laser medium in a zig zag pattern consisting of alternate sheets of the liquid laser medium being parallel and adjacent sheets being angularly disposed relative to each other to form equal angles therebetween, each thin sheet of liquid laser medium having two opposing major surfaces defined by the length and breadth thereof, pumping radiation means positioned adjacent at least one of the major surfaces of each liquid laser medium sheet and in optical communication therewith for optically pumping the liquid laser medium through said at least one major surfaces and thereby exciting the active liquid laser medium sufficiently to establish a population inversion in a particular laser liquid, and means for stimulating the emission of a beam of coherent electromagnetic radiation from said active liquid laser medium sheets through said major surfaces, said laser liquid containing and sheet forming means comprising:

a plurality of serially positioned, closely spaced apart refracting prisms having adjacent planar first and second major surfaces contiguous with the two major surfaces of the sheets of liquid laser medium formed therebetween, said refracting prisms being substantially totally transparent to the pumping and coherent radiations, said pumping radiation means positioned adjacent planar third major surfaces of at least alternate said refracting prisms wherein the third major surfaces of the intermediate positioned prisms subtend the first and second major surfaces, the third surfaces of alternate prisms being coplanar, the pumping radiation incident on the third surfaces of said prisms being refracted and reflected through the prisms to produce substantially uniform pumping along the major surfaces of the laser liquid sheets, the beam of emitted coherent radiation being substantially coincident with the longitudinal axis of the zig-zag pattern which passes through the centers of the laser liquid sheets, said laser liquid containing and sheet forming means further comprising:

first and second planar parallel side members each contiguous with alternate said third surfaces of said prisms for confining each liquid sheet along two narrow opposite sides of a corresponding adjacent prism spacing wherein the narrow sides define the sheet thickness, said side members retaining said prisms in the serial relationship and being substantially totally transparent to the pumping radiation, said side members extending beyond the third surfaces of said prisms in a first direction for retaining an input channel member which is supplied with the laser liquid, said side members extending in a second direction opposite to the first for retaining an output channel member, said input and output channel members retained in liquid-tight communication along two other narrow opposite sides of the adjacent prism spacings for respectively supplying the laser liquid to the spacings and exiting it therefrom in a direction transverse to the axis of the laser beam, first and second planar end members each contiguous with an outer surface of a corresponding one of the extreme positioned prisms for further retaining said prisms in the serial relationship and being substantially totally transparent to the coherent radiation, the aperture of said laser device being determined by the length and breadth of the major surfaces of the sheets of liquid laser medium and the angular disposition of adjacent sheets so that a large aperture device may be obtained.

2. The face-pumped liquid laser device set forth in claim 1 wherein:

said first side member disposed along a first side of said laser device between said pumping radiation means and alternate third surfaces of said prisms, and said second side member disposed along a second side of said laser device opposite to the first side and provided with a means for reflecting the pumping radiation back into the sheets of laser liquid that said laser device may be optically pumped from one side only with a high degree of efficiency.

3. The face pumped liquid laser device of claim 1 wherein:

said first and second side members disposed between said pumping radiation means and alternate said third surfaces of said prisms along opposite sides of said laser device so that said device is optically pumped from both sides.

4. The liquid laser device set forth in claim 1 wherein said pumping radiation means comprises at least one flash lamp disposed in parallel relationship with the longitudinal axis of the zig-zag pattern along each side of said laser device.

5. The liquid containing and laser device set forth in claim 1 wherein said laser liquid sheet forming means further comprise means for retaining said prisms in the spaced apart positions.

6. The liquid laser device set forth in claim 1 wherein said pumping radiation means includes at least one right angle prism having an index of refraction at least equal to the square root of two, the right angle subtending surface of said right angle prism oriented parallel to the longitudinal axis of said laser device and adjacent the third major surfaces of at least one of the said plurality of refracting prisms, said pumping radiation means further includes a plurality of flash lamps positioned parallel to the longitudinal axis of said laser device and parallel to at least one right angle defining surface of said right angle prism, said right angle prism increasing the flux density of the pumping radiation available for optically exciting the laser liquid by a factor of approximately the square root of two.

* * * * *